United States Patent [19]

Farkonas

[11] Patent Number: 4,885,821
[45] Date of Patent: Dec. 12, 1989

[54] METHOD AND APPARATUS FOR SEVERING SHIRRED TUBULAR FOOD CASING AND ARTICLE

[75] Inventor: John Farkonas, Glenview, Ill.

[73] Assignee: Viskase Corporation, Chicago, Ill.

[21] Appl. No.: 226,635

[22] Filed: Aug. 1, 1988

[51] Int. Cl.⁴ ............................................. A22C 13/02
[52] U.S. Cl. .......................................... 17/49; 17/34; 17/45; 17/52; 83/171; 206/802; 138/118.1
[58] Field of Search ..................... 17/45, 49, 1 R, 42, 17/41, 52, 33, 34, 35, 38; 83/171, 76, 53; 138/118.1, 109; 206/802; 428/36; 493/308, 287, 288, 291; 53/581

[56] References Cited

U.S. PATENT DOCUMENTS

| 3,158,896 | 12/1964 | Marback | 17/45 |
| 3,936,909 | 2/1976 | Carter | 17/42 |
| 4,052,770 | 10/1977 | Asquith | 17/42 |
| 4,084,466 | 4/1978 | Sipusic et al. | 83/193 |
| 4,153,975 | 5/1979 | Ziolko | 17/45 |
| 4,164,057 | 8/1979 | Irey et al. | 17/49 |
| 4,295,247 | 10/1981 | Trimble et al. | 17/1 R |
| 4,307,488 | 12/1981 | Lofland et al. | 17/42 |
| 4,547,932 | 10/1985 | Romeike et al. | 17/45 |
| 4,557,018 | 12/1985 | Martinek | 17/49 |
| 4,562,617 | 1/1986 | Kollross | 17/49 |
| 4,649,602 | 3/1987 | Kupcikevicius | 17/49 |

FOREIGN PATENT DOCUMENTS 3608983 10/1987 Fed. Rep. of Germany .......... 17/49

Primary Examiner—Willis Little
Attorney, Agent, or Firm—Roger Aceto

[57] ABSTRACT

The severing of a shirred stick from unshirred casing is accomplished by pressing and annular tear edge directly against the last-shirred end of the stick and tearing unshirred casing away from the stick along this edge. The result is little or no tail of loose casing at the last-shirred end. Characteristically, the resulting torn ends both extend normal to the casing longitudinal axis. In addition, this torn end at the first-shirred end of the stick is clean and continuous whereas the torn end at the last-shirred end of the stick contains one or more tags or loose shreds of casing.

30 Claims, 2 Drawing Sheets

METHOD AND APPARATUS FOR SEVERING SHIRRED TUBULAR FOOD CASING AND ARTICLE

TECHNICAL FIELD

The present invention relates to the production of shirred casing sticks and more particularly to a method and apparatus for separating a shirred stick from a feed stock supply of unshirred casing, and a shirred casing article.

BACKGROUND OF THE INVENTION

Food casings of regenerated cellulose are widely used for the production of various stuffed food products. Cellulosic casing for production of large diameter sausages such as bologna and the like generally are reinforced with a fibrous web. The present invention, however, is concerned primarily with thin walled unreinforced cellulosic casing as may be used in the production of small diameter sausages such as frankfurters and the like.

For convenience of handling, food casings which may be 20 to 50 meters or more in length are shirred and preferably compressed to produce what commonly are referred to as "shirred casing sticks". Such casing sticks are hollow cylinders about 20 to 60 centimeters in length. Shirring machines for producing these shirred sticks are well known in the art and are disclosed in U.S. Pat. Nos. 2,983,949 and 2,984,574 among others. Shirring and related technology also are described in the Noyes Data Publication "Sausage Casing Technology" by Karmas (1974) at pages 259–347.

Cellulosic casing for the shirring operation is supplied in reels. The flat casing feed stock, drawn from a reel, is fed into a shirring machine where it is inflated with low pressure gas, usually air. The inflated casing is passed onto and along a mandrel and through an array of shirring rolls. In one form of shirring, the shirring rolls gather the casing about the mandrel into generally conical pleats nested one tightly against another. The inner folds of the pleats are formed against the mandrel and define the surface of an axial bore through the stick.

When a preselected shirred length has been attained, it is separated from the unshirred feed stock and moved longitudinally away from the array of shirring rolls for further processing. Such further processing may include, for example, a compaction operation where the shirred length is reduced and an operation where a closure is formed and inserted to stop or plug the bore at one end of the casing thereby forming a "closed" end. The other end of the casing is left open to permit mounting of the shirred stick onto a stuffing horn.

Separation of the last shirred end of the stick from the reel feed stock has been accomplished both manually and by automatic means. Separation generally leaves a loose length or "tail" of casing extending from the pleats at the last shirred end. This tail is not desirable particularly in shirred sticks for frankfurter production, as it detracts from both the appearance and use of the stick. For example, a tail at the open end may partly occlude the bore opening and thus interfere with the automatic loading of the shirred stick onto the stuffing horn.

Separation by other than a transverse cut through the casing often produces ragged ends having one or more loose tags of casing on one or both of the severed ends. A tag may separate from the casing and mix with the food product being stuffed into the casing. This is especially the case where the casing is stuffed with frankfurter emulsion and the tags are on the closed end of the stick which comes into direct contact with the food emulsion.

One common method for dealing with the loose tail is to remove it by manually peeling it from the shirred stick so that only tightly nested pleats remain at the end of the stick. Methods also have been employed to mold or dress the open end of frankfurter casing so that the tail is pressed tightly to the nested pleats.

Various methods have been proposed to reduce the length of the tail and the raggedness of the severed ends. For example, U.S. Pat. No. 4,547,932 discloses a guillotine severing method in which a blade cuts completely through the casing to provide a neat square-ended cut. While this method avoids a ragged end, it still leaves a tail at the open end of the stick. It also requires mandrel components that axially separate to provide a gap which permits a cutter to pass completely through the casing. Once the mandrel components are separated, it may be difficult to realign and reconnect them to shirr another stick.

Other methods have been proposed to sever the casing cleanly without the need to axially separate the mandrel. For example, in U.S. Pat. No. 3,878,978 a stream of liquefied carbon dioxide is directed against the casing until it becomes brittle from the cold. A force against the brittle casing shatters it without leaving a loose tail. However, small particles of frozen casing may be displaced into the bore of the stick and become entrained in the food product during stuffing.

U.S. Pat. Nos. 3,936,909 and 4,627,718 also describe improved methods of separating the shirred stick from the reel feed stock. The '718 patent describes a high pressure water jet which rotates around the casing to sever the stick from the reel feed stock. However, the use of water as the cutting medium may alter the moisture balance along the stick length. In the '909 patent an unshirred portion of casing is contacted about its circumference with a hot wire or is partially perforated by a cutter. The feed stock casing is then held while the shirred stick is moved away. This overstresses the weakened or partially perforated area and results in a separation of the unshirred casing from the shirred stick. This method requires that the casing be weakened at some point intermediate the shirred stick and unshirred length so that separating in this fashion inherently leaves a tail of casing extending from the last shirred and tightly nested pleats.

OBJECTS OF THE INVENTION

One object of the present invention is to provide an improved method and apparatus for separating a length of shirred casing from the feed stock of unshirred casing.

Another object of the present invention is to provide a method and apparatus of the type described which results in severed edges that extend substantially normal to the longitudinal axis of the casing.

A further object of the present invention is to provide a method and apparatus for severing the casing which leaves little or no loose casing extending from the last shirred end of the stick.

Yet another object of the present invention is to provide a casing severing method and apparatus which results in severed edges which extend normal to the longitudinal axis of the casing and avoids loose tags of casing at the closed end of the stick.

A still further object is to provide a shirred stick wherein the severed ends of the casing at both the first-shirred and last-shirred ends of the stick are generally normal to the longitudinal axis of the stick and wherein there are no tags at the first-shirred end and one or more tags at the last-shirred end.

SUMMARY OF THE INVENTION

In one aspect, the present invention is characterized by a shirring method including inflating and moving a tubular food casing longitudinally in a shirring direction over a mandrel and into a shirring zone, shirring the inflated tubular casing in the shirring zone to form a shirred stick composed of generally conical pleats nested one within another with the innerfold of each pleat being formed against the mandrel, and then stopping the shirring when a desired length of shirred stick has accumulated on the mandrel, the improvement comprising;

(a) longitudinally separating the shirring zone and shirred stick to provide a space therebetween and expose a section of unshirred tubular casing which extends from the shirring zone and merges into the shirred conical pleats defining the end face of the stick at the last-shirred end thereof;

(b) positioning an arcuate tear edge about the conical pleats at said end face;

(c) holding the unshirred tubular casing against longitudinal movement in the shirring direction;

(d) driving the tear edge longitudinally in the shirring direction and against said end face while continuing said holding step (c) to move the stick longitudinally along the mandrel relative to the shirring zone and away from the exposed section of tubular casing; and (e) continuing said holding step (c) and driving step (d) thereby first tensioning the exposed section of tubular casing and thereafter transversely tearing it from the stick along said tear edge at said end face.

In another aspect, the invention is characterized by a shirring apparatus comprising:

(a) means for feeding an unshirred tubular casing in a longitudinal direction through a shirring means for gathering said casing into pleats to form a shirrred stick of casing;

(b) means operable when a desired length of shirrred stick is formed for holding the unshirred casing against movement in said longitudinal direction;

(c) means for longitudinally separating said shirring means and shirrred stick to expose a length of unshirred tubular casing therebetween which extends to and merges with the shirred pleats defining the last-shirred end face of the shirred stick;

(d) a casing tearing member including an arcuate tear edge oriented transverse the longitudinal axis of the shirred stick and positionable against said last-shirred end face; and (e) drive means operatively connected to said member for pressing said tear edge against said end face and moving said shirred stick longitudinally away from said shirring means so as to apply tension to said unshirred tubular casing and transversely tear it from said shirred stick at said end face.

The invention is further characterized by a shirred stick composed of a length of tubular cellulosic food casing shirred to form generally conical pleats nested tightly one against another, the stick having a last-shirred open end including a terminal edge of the casing length which extends substantially normal to the longitudinal axis of the casing length and which contains at least one pointed tag of casing formed by a fracture extending obliquely inward from said terminal edge; and the stick having a first-shirred end including a terminal edge of the casing length which extends substantially normal to the longitudinal axis of the casing length and is tag-free.

DETAILED DESCRIPTION OF THE INVENTION

Figure 1:
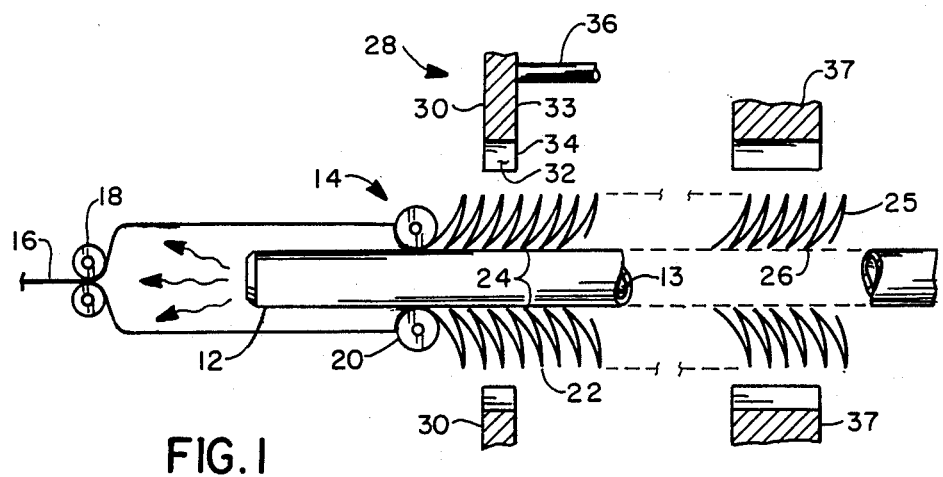
FIGS. 1-3 illustrate in schematic fashion a sequence of steps in the severing method of the present invention.

Referring to the drawings, FIG. 1 shows several components of a conventional shirring machine including a mandrel 12 and a shirring head 14. It should be appreciated that the shirring machine can be either of the two types in general commercial use including a so-called "floating mandrel machine" of the type generally described in U S. Pat. No. 3,766.603 or a "withdrawing mandrel" machine as generally described in U.S. Pat. No. 2.583,654.

Flattened feed stock casing 16 is drawn from a supply reel (not shown) and is fed onto the mandrel through the nip of driven feed rolls 18. As the casing passes onto the mandrel, it is inflated by air issuing from an axial passage 13 in the mandrel. The inflated casing passes along the mandrel and moves into the shirring head 14. The shirring head defines a shirring zone in which the inflated casing is gathered or shirred into pleats about the mandrel 12 to form a shirred stick 22 which exits from the shirring zone. The innerfolds 24 of the pleats are formed against the mandrel and define a longitudinal bore 26 through the shirred stick. The shirring head 14 may comprise any of the known shirring means as described, for example, in U.S. Pat. Nos. 3,461.484, 4,185,358, 4,370,780 or 4,374,447 among others. For purposes of illustration, the shirring head 14 is shown as comprising a multiplicity of toothed shirring wheels 20, usually three in number of a general type which is described in U.S. Pat. No. 3,461,484.

It should be appreciated that the shirring proceeds in conjunction with known shirred casing holdback means (not shown). This holdback means retards the advance of the shirred pleats along the mandrel in order to provide a substantially regular pleat formation wherein the pleats are laid tightly one against another. In a preferred embodiment the shirring wheels lay the pleats at an angle of about 30° with respect to the longitudinal axis of the mandrel so that the overall shirred length is somewhat like a stack of interconnected nesting cones. In a conventional shirring operation, the outside diameter of the shirrred stick 22 is larger than the inflated diameter of casing feed stock 16.

After a desired length of casing has been shirred, the shirred stick must be separated from the feed stock. Once the shirred stick is separated, it may be subject to further operations (not shown) such as a compaction step to further reduce its length and a step to provide one end of the stick, e.g., the first shirred end 25, with a closure means.

Figure 3:
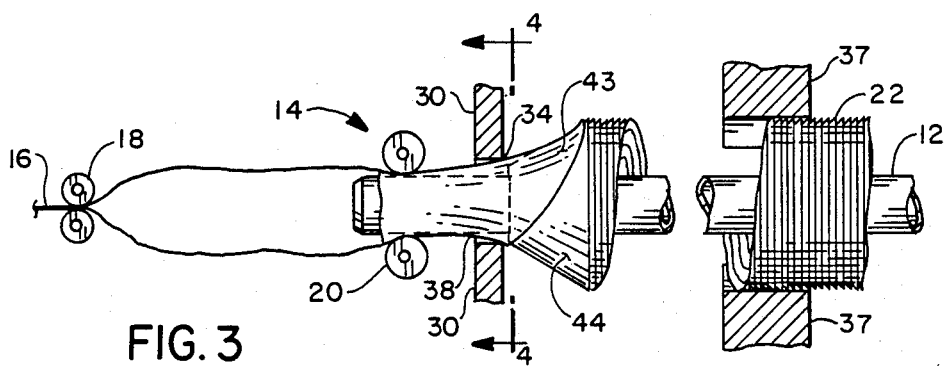
Figure 4:
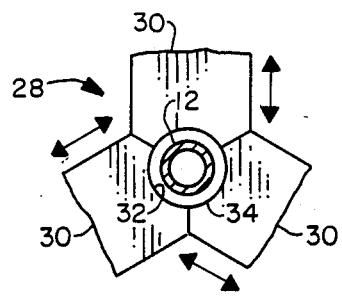
FIG. 4 is a view taken along lines 4—4 of FIG. 3 showing a preferred severing means in a closed position.
Figure 5:
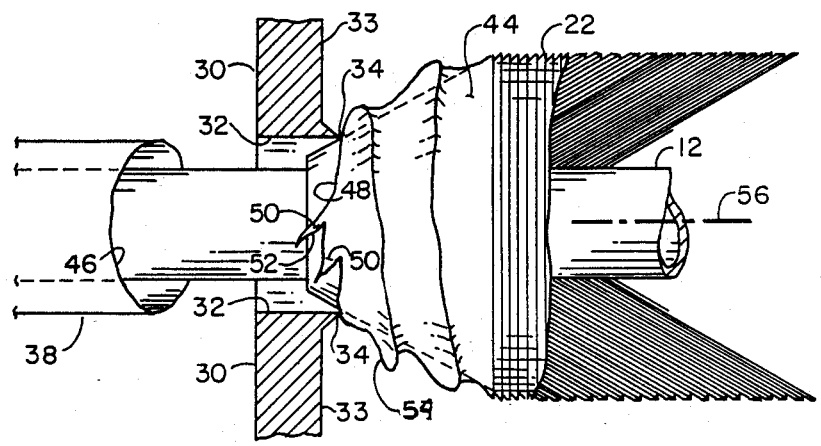
FIG. 5 is a view of the last-shirred end of a shirred stick showing, on an enlarged scale, the engagement of a tear edge of the severing means against the conical end face of a shirred stick just after separation.

For purposes of separating the shirred stick 22 from the feed stock 16, FIG. 1 shows a severing means generally indicated at 28 positioned adjacent the shirring head 14 on the exit or shirred stick side of the shirring zone. As best shown in FIG. 4, the severing means 28 comprises multiple radially movable jaws 30, preferably three in number. Each jaw 30 is oriented substantially normal to the longitudinal axis of the mandrel 12 and is movable radially between an open position (FIGS. 1 and 2) and a closed position (FIGS. 3–5). The inner surface 32 of each jaw is arcuate so that when the jaws are in a closed position the inner surfaces 32 form a closed, substantially continuous annular surface. The diameter of the annular surface 32 defined by the closed jaws is smaller than the outside diameter of the shirred stick 22 (FIGS. 3 and 5) and larger than the diameter of mandrel 12 so the jaws do not press against the mandrel. In the open position (FIGS. 1 and 2). the jaws 30 are moved radially away from the mandrel to permit the passage of the shirred stick 22.

As best seen in FIG. 1, the intersection of each arcuate inner surface 32 with the leading end face 33 of each jaw defines an arcuate leading edge 34. The leading edge 34 is provided for tearing the casing so preferably it is a relatively sharp edge such as a knife edge. However, other possible configurations include a blunt or beveled edge which matches the cone angle or a serrated edge. As shown in FIG. 4, the edges 34 of each jaw come together in the jaw closed position to form a substantially continuous annular tear edge.

In addition to radial movement, the jaws 30 are mounted to a drive means a portion of which is shown at 36 in FIG. 1) for moving the jaws longitudinally relative to the mandrel 12. Completing the structure for purposes of this description is a split ring, portions of which are shown at 37 The ring is closable about the shirred stick 22 (FIG. 3) for purposes set out hereinbelow.

In operation, the shirring of the inflated feed stock 16 as illustrated in FIG. 1 progresses until the desired length o shirred stick accumulates on the mandrel. The feeding and shirring operations stop and several events occur in rapid sequence.

Figure 2:
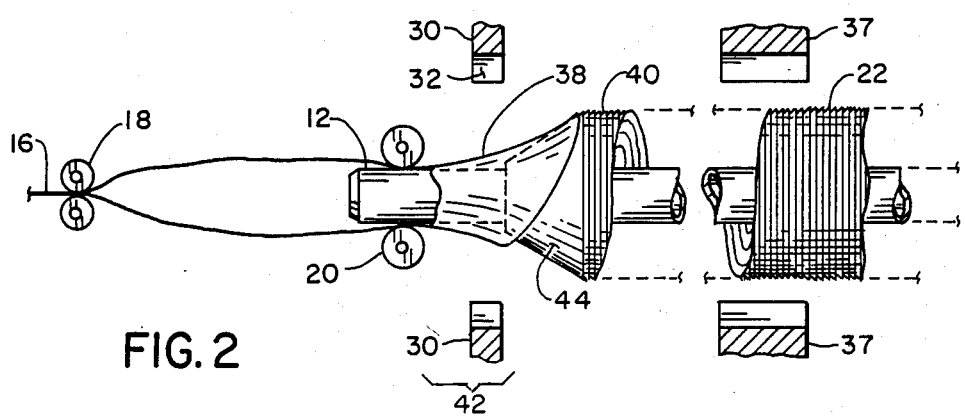

As illustrated in FIG. 2, the inflating air is shut-off so the casing can deflate and the mandrel 12 is displaced several inches in the shirring direction (longitudinally to the right as shown in the figures). This displacement of the mandrel can itself cause an interruption of the air flow through passage 13 and deflation of the casing. The longitudinal displacement of mandrel 12 also carries the shirred stick 22 away from the shirring rolls 20 to provide a space 42 therebetween. The casing feed stock 16 is prevented from moving in the shirring direction as the stick moves away from the shirring roll so that a length of casing 38 peels or deshirrs from the conical pleats at the last-shirred end portion 40 of the stick. Preventing the feed stock from moving in the shirring direction can be accomplished by braking the feed stock reel or by clamping the feed stock to the mandrel, preferably, it is accomplished by holding the feed stock at the nip provided by the stopped feed rolls 18. Thus, the longitudinal movement of the mandrel while the feed stock is held at the nip of driven feed rolls 18 provides a clearance space 42 between the shirring rolls 20 and the last-shirred end portion 40, and also exposes, in the clearance space 42, an unshirred section of casing 38.

This exposed unshirred section of casing 38 extends from the shirring rolls 20 and merges into the shirred conical pleats defining the end face 44 of the stick. Since the casing 38 exposed in the space 42 is deshirred from the last-shirred pleats of the stick 22, the pleats which now define the last-shirred end face 44 of the stick are pleats which were shirred prior to termination of the shirring operation and comprise well defined tightly nested conical pleats.

The purpose of providing the clearance space 42 is to expose the last-shirred conical end face 44 of the stick so the severing means 28 can contact and press directly against the end face. Exposure of the conical end face 44 also can be achieved by translating the shirring rolls 20 forward (to the left as viewed in the figures) or by opening them radially. However, the longitudinal movement of the mandrel is preferred because it causes the pleats at the last-shirred end to peel back as described.

After the mandrel is displaced longitudinally, the jaws 30 close radially towards the mandrel. At the closed position, as shown in FIG. 3, the annular tear edge 34 is located just forward of, and preferably on, the conical end face 44. Since the inflating air is shut-off the portion of unshirred casing 43 immediately adjacent the end face 44 will be drawn down against the conical end face by the closing jaws.

If the casing is not deflated prior to closing the jaws 30, casing portion 43 may billow and lift from the conical end face 44 which interferes with a clean severing of the casing at the stick end face. Also, it has been found that the pressure exerted by the inflating air against the end face 44 of the stick may push the stick along the mandrel so the end face no longer is in proper alignment with the tear edges 34.

After the jaws 30 close, the mandrel returns to its start position which seats the conical end face 44 tightly against the annular tear edge 34 formed by the closed jaws. The shirred stick 22 is not seized on the mandrel so the mandrel moves relative to the stick after the conical end face 44 is seated against the closed jaws. Next, the split ring 37 closes about the outside surface of the shirred stick and the drive means 36 is operated to move the closed jaws longitudinally in the shirring direction. The annular tear edge 34 defined by the closed jaws presses against the tightly nested pleats of the stick end face 44 and drives the stick 22 along the mandrel 12 and away from the shirring head 14. As noted hereinabove, the inside diameter of split ring 37 is slightly smaller than the outside diameter of stick 22. Accordingly, the closed split ring will resist, but not prevent, the movement of the stick by the closed jaws. It should be appreciated that closing the split ring 37 about the stick creates a drag to resist the movement of the shirred stick which, in turn, keeps the end face 44 of the stick seated tightly against the annular tear edge 34 and prevents further deshirring of casing from the end face.

On one hand, the nip at the feed rolls 18 holds and prevents the movement of the feed stock casing 16 in the shirring direction as the stick moves. On the other hand, the pressing engagement of the annular tear edge 34 against the last-shirred end face 44 of the stick prevents further deshirring from this end. As the stick is pushed in the shirring direction the unshirred casing length 38 is tensioned and high localized stresses are created along the annular tear edge 34 defined by the closed jaws. As the closed jaws continue to push on the stick end face 44 and move the stick, the tensioned unshirred casing length 38 will start to tear or fracture at one or more points along the tear edge 34. From each initiation point, the tear rapidly propagates in opposite directions around the casing and along the tear edge 34 so that the unshirred casing 38 snaps away from the tightly nested pleats at the last-shirred end face 44 of the stick (FIG. 5). After the shirred casing stick separates from the feed stock and unshirred casing 38 it can be transferred to another work station for compaction before doffing from the mandrel.

The torn ends resulting from the severing method as described are shown in FIG. 5. Examination discloses that the unshirred casing 38 has a torn end with a terminal edge 46 that extends substantially normal to the longitudinal axis of the casing. Also, this edge is clean and continuous in that it is characterized by the absence of any loose tag of casing which may be separated or broken free of the severed end. On the shirred stick side the torn end also has its terminal edge 48 extending substantially normal to the longitudinal axis of the casing. However, terminal edge 48 contains one or more casing tags 50. Characteristically, each tag 50 is generally cuneate wherein the pointed configuration of the tag is formed by an oblique fracture or cut 52 extending inwardly from the terminal edge 48. This permits the pointed tag to fold out of the plane of the surface of the casing so it can be separated, broken or torn from the edge 48.

Figure 6:
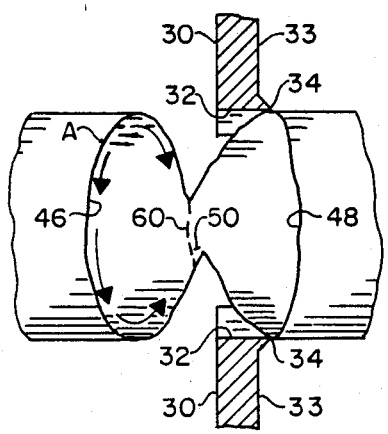
FIG. 6 is a schematic view presented to illustrate the propagation of a tear around the casing as a shirred stick is separated from casing feed stock.

A tag 50 typically is formed on the casing end which does not move relative to the tear edge 34. In the present invention, there is no relative movement between the tear edge 34 and the conical end face 44 so tags generally will only appear on the terminal edge 48. As illustrated in FIG. 6, it is believed that a pointed tag is formed when a fracture or tear, which initiates along the tear edge 34 at some point A on the circumference of the tensioned casing. Propagates in opposite directions around the casing. If the tear propagations fail to meet in the same transverse plane, they overlap and bypass one another. The continuation of one tear propagation into the other as shown by dotted line 60, causes the formation of a pointed tag 50 on casing end 48 as the ends 46 48 part one from another. A tear can initiate at any one or more points along the tear edge 34. If for some reason a tear propagation begins at only one point, and the propagations from only this one point result in the severing of the casing as illustrated in FIG. 6, then only one tag 50 will be formed. It is more likely, however, that tears will start and propagate from several points along the tear edge 34 so that a plurality of tags 50 will be formed.

The use of three jaws 30 as shown in the FIG. 4 is preferred. This arrangement facilitates the centering of the severing means against the conical end face 44 of the shirred stick so that substantially the entire annular tear edge 34 presses against the conical end face 44 of the stick. As a result, the severed ends 46,48 are oriented substantially normal to the longitudinal axis 56 of the casing as shown in FIG. 5.

It has been found that the location of the point of contact of the tear edge 34 against the conical end face 44 of the stick will effect the quality of the severed end. If the circumference defined by the closed jaws is relatively large, the tear edge 34 will contact high up on the conical end face 44 near the outer circumference of the stick. This will makes it possible for casing pleats at the end face to slip beneath the cutting edge and deshirr before sufficient force is applied to tension and sever the casing. The result is an undesirably long tail of casing extending from the tightly nested pleats at the end face. On the other hand, if the closed circumference of the jaws hugs the mandrel, the tear edge 34 will contact the conical end face 44 near the mandrel. This may result in a severed end which hugs the mandrel 12 which is not desired because a portion of casing adjacent the mandrel could interfere with a subsequent operation such as the compression of the stick. A preferred point of contact is against the conical and face adjacent but below the mid point of the end face.

It has been found that when using a cone angle of about 30°, locating the annular tear edge 34 about 0.050 inch (1.27 mm) from the mandrel 12 provides severed edges which are acceptable for small size casings of various inflated diameters ranging in size from about 15 mm to 40 mm. Also, by tearing the casing against an annular tear edge pressed tightly to the conical end face of the stick as shown in FIG. 5, any tail 54 of loose casing which is produced is relatively short and does not appreciably extend beyond the tightly nested pleats at the conical end face 44. The tail 54 also is located radially away from the mandrel. Both of these conditions i.e., the tail location and length, allow the tail to be easily pressed and formed to the tightly nested pleats at the last-shirred end 44 of the stick during a subsequent compacting operation.

It should be noted from the FIG. 5 that there are no tags on the severed end 46 of unshirred casing length 38. This end 46 becomes located adjacent the first-shirred end of the stick next produced by the shirring machine. Accordingly, any given shirred stick 22 produced by the machine will have casing at its first-shirred end severed along a continuous, tag-free edge 46 which extends generally normal to the longitudinal axis of the casing.

A tag-free first-shirred end of the stick is most desirable. This is because a closure generally is formed of casing drawn from the first-shirred end of the stick. During stuffing, the closure comes into direct contact with the food emulsion. After stuffing, food emulsion generally is stripped out of the closure and recycled. The stripping operation may cause any tag to break off the casing, mix with the food emulsion and render the food emulsion unfit for recycling.

The trailing or last shirred-end of the stick will have a terminal edge 48 which also is generally normal to the longitudinal axis of the stick. As shown in FIG. 5, this edge is characterized by having one or more tags 50. Thus, any tag which may be formed by the severing operation will be located at the terminal edge 48 of the last-shirred end of the stick. Since this edge is located at the stick end which is left open to accommodate the entry of a stuffing horn, it is less likely to come into direct contact with the food emulsion. Moreover, the last shirred end of the stick generally is not subjected to a stripping operation so that the existence of one or more tags 50 on this edge can be tolerated.

As stated hereinabove, the method of the present invention primarily is useful for severing small size unreinforced cellulosic casing used in the production of frankfurters and the like. However, the method also can be used for severing fibrous casing. When severing fibrous casing, the length of the loose tail at the last-shirred end of the stick is not as critical as it is in shirred sticks of frankfurter size casing because fibrous casings generally are loaded manually to the stuffing machine. Also, the first-shirred end of fibrous casing generally is permanently closed with a metal clip and no stripping operation is performed so a tag on this end can be tolerated. Accordingly, when severing fibrous casing the position of the arcuate inner surface 34 of each jaw 30 relative to the conical end face 44 is not critical so it can be positioned close to the mandrel 12 with only a clearance space between the mandrel and arcuate surface. Longitudinal movement of the closed jaws will then carry the annular tear edge 34 against the stick end face to tension and sever the casing.

Thus it should be appreciated that the present invention accomplishes its intended objects of providing a severing method and apparatus particularly for unreinforced cellulosic casing, which provides severed ends oriented substantially normal to the longitudinal axis of the casing, leaves little or no loose tail of casing at the last-shirred end of the stick, locates any tags at the last-shirred end of the stick, and avoids the formation of tags on the first-shirred end of the stick.

Having described the invention in detail, what is claimed as new is:

1. In a shirring method including longitudinally moving a tubular food casing in a shirring direction over a mandrel and into a shirring zone, shirring the tubular casing in the shirring zone to form a shirred stick composed of generally conical pleats nested one within another with the innerfold of each pleat being formed against the mandrel, and then stopping the shirring when a desired length of shirred stick has accumulated on the mandrel, the improvement comprising;
   (a) longitudinally separating the shirring zone and shirred stick to provide a space therebetween and expose a section of unshirred tubular casing which extends from the shirring zone and merges into the shirred conical pleats defining the end face of the stick at the last-shirred end thereof;
   (b) positioning an arcuate tear edge about the conical pleats at said end face;
   (c) holding the unshirred tubular casing against longitudinal movement in the shirring direction;
   (d) driving the tear edge longitudinally in the shirring direction and against said end face while continuing said holding step (c) to move the stick longitudinally along the mandrel relative to the shirring zone and away from the exposed section of unshirred tubular casing; and
   (e) continuing said holding step (c) and driving step (d) thereby first tensioning the exposed section of tubular casing and thereafter transversely tearing it from the stick along said tear edge at said end face.

2. A method as in claim 1 including deflating said exposed section of unshirred tubular casing prior to said positioning step (b).

3. A method as in claim 1 wherein said separating step (a) is accomplished by longitudinally displacing the mandrel in the shirring direction thereby carrying the shirred stick away from the shirring zone to provide said space therebetween.

4. A method as in claim 3 wherein displacing the mandrel is accomplished during said holding step (c) thereby deshirring casing from the last-shirred end of the stick and said deshirred casing constitutes said exposed section of tubular casing.

5. A method as in claim 3 including returning said mandrel towards said shirring zone after said positioning step (b) to seat the conical end face of the stick against said tear edge and thereafter driving the tear edge longitudinally in the shirring direction at step (d).

6. A method as in claim 1 wherein said positioning step (b) includes:
   (a) moving said tear edge into said space from a radially remote position; and thereafter
   (b) moving said tear edge longitudinally and against said end face.

7. A method as in claim 6 wherein said tear edge comprises multiple arcuate sections and said sections close together during radial movement towards said space to form a substantially continuous annular tear edge.

8. A method as in claim 7 wherein said tear edge comprises three arcuate sections.

9. A method as in claim 7 wherein tearing of said exposed length of tubular casing from the stick occurs along said annular tear edge to produce a torn end of casing which is substantially normal to the longitudinal axis of the casing.

10. A method as in claim 1 including during step (d), applying a resisting force to the shirred stick in a direction opposite to the shirring direction thereby maintaining the last-shirred end of the stick tightly seated against said tear edge.

11. A method as in claim 10 wherein said resisting force is applied by pressing a drag member against the outer surface of the stick as the stick moves longitudinally in the shirring direction relative to the drag member.

12. A method for severing a shirred casing stick from a length of unshirred feed stock comprising:
   (a) inflating and feeding the feed stock casing longitudinally in a shirring direction into a shirring zone and shirring the inflated feed stock casing in said zone to form a shirrred casing stick;
   (b) stopping said feeding and shirring and then deflating said feed stock after a desired length of shirred stick is formed;
   (c) holding said deflated feed stock casing against longitudinal movement in the shirring direction and displacing said shirred stick longitudinally away from said shirring zone thereby deshirring the last-shirred pleats of said stick and providing a length of unshirred casing extending from said shirring zone and merging into the end face of said stick;
   (d) positioning an annular tear edge around said unshirred casing and against said end face; and
   (e) while continuing to hold said deflated feed stock against longitudinal movement in the shirring direction, driving said tear edge longitudinally away from said shirring zone to move said stick relative to said held feed stock thereby tensioning and tearing said unshirred casing from said end face along said annular tear edge.

13. A method as in claim 12 wherein said positioning step comprises:
   (a) placing said end face in alignment with a multiplicity of arcuate tear edges spaced radially outward and around said unshirred casing; and (b) moving said arcuate tear edges radially inward to close them together thereby forming said annular tear edge.

14. A method as in claim 13 including displacing said shirred stick towards said annular tear edge to seat said end face thereagainst.

15. A method as in claim 14 including applying a drag to said shirred stick during said driving step (e) for maintaining said tear edge seated against said end face during said tensioning and tearing.

16. A shirring apparatus comprising:
(a) means for feeding tubular casing feed stock in a longitudinal direction through a shirring means for gathering said casing feed stock into pleats to form a shirred stick of casing;
(b) means operable when a desired length of shirred stick is formed for holding the feed stock casing against movement in said longitudinal direction;
(c) means for longitudinally separating said shirring means and shirred stick to expose a length of unshirred tubular casing therebetween which extends to and merges with the shirred pleats defining the last-shirred end face of the shirred stick;
(d) a casing tearing member including an arcuate tear edge oriented transverse the longitudinal axis of the shirred stick and positionable against said last-shirred end face; and
(e) drive means operatively connected to said casing tearing member for pressing said tear edge against said end face and moving said shirred stick longitudinally away from said shirring means so as to apply tension to said unshirred tubular casing and transversely tear it from said shirred stick at said end face.

17. Apparatus as in claim 16 wherein said means (c) operates to move said stick longitudinally away from said shirring means while said means (b) operates to hold the casing feed stock so that the length of unshirred casing exposed between said shirring means and shirred stick comprises casing deshirred from pleats at the last-shirred end of said stick.

18. Apparatus as in claim 17 wherein said casing tearing member is movable radially between an open position spaced radially outward from said exposed unshirred casing and a closed position and said tear edge at said closed position being adjacent said last-shirred end face.

19. Apparatus as in claim 18 wherein said tear edge is annular at said closed position.

20. Apparatus as in claim 16 including drag means pressable against said shirred stick for resisting the longitudinal movement thereof whereby the last-shirred end of said stick is seated against said tear edge.

21. Apparatus as in claim 20 wherein said drag means is closable about the outer surface of said shirred stick.

22. Apparatus for severing a shirred casing stick from unshirred feed stock casing comprising:
(a) a mandrel receiving feed stock casing for shirring and means associated with said mandrel for inflating the feed stock casing received on said mandrel;
(b) casing delivery means defining a nip through which said feed stock is driven in a longitudinal direction and along said mandrel;
(c) shirring means operating in conjunction with said mandrel for shirring the inflated feed stock casing into generally conical pleats nested one against another to form said shirred stick;
(d) means for deflating said feed stock after a desired shirred length is attained;
(e) holding means operable to hold deflated feed stock against movement in said longitudinal direction;
(f) means for displacing said desired shirred length in said longitudinal direction relative to said holding means and away from said shirring means for providing a space between said shirring means and the last-shirred end of said stick and causing the deshirring of pleats from said last-shirred end so that a length of deflated unshirred casing is exposed in said space which extends from said shirring means and merges into the conical end face of said stick;
(g) casing tearing means movable into said space, and including an arcuate tear edge positionable about said exposed deflated casing and against said conical end face; and
(h) said casing tearing means being operable in cooperation with said holding mean and movable in said longitudinal direction for pressing said tear edge directly against said end face and moving said shirred stick relative to held feed stock thereby tensioning said deflated unshirred casing and tearing it from said end face along said tear edge.

23. Apparatus as in claim 22 wherein said holding means comprises said nip at said delivery means.

24. Apparatus as in claim 22 wherein said mandrel is longitudinally displaceable and comprises said displacing means.

25. Apparatus as in claim 24 wherein said mandrel is displaceable towards said shirring means after the movement of said casing tearing member into said space for seating the conical end face of said shirred stick against said arcuate tear edge.

26. Apparatus as in claim 22 wherein said casing tearing means includes a plurality of members each having an arcuate tear edge oriented in a plane substantially normal to the longitudinal axis of said mandrel, said plurality of members each being radially movable between an open position spaced outwardly from said mandrel and a closed position adjacent said mandrel, and at said closed position said arcuate tear edges defining a substantially continuous annular tear edge pressable directly against said shirred stick conical end face.

27. Apparatus as in claim 26 including drag means closable about the outer surface of said stick to resist the movement of said stick in said longitudinal direction by said casing tearing means and thereby seat said end face against said annular tear edge.

28. A shirred casing article comprising:
(a) a shirred stick composed of a length of tubular cellulosic food casing shirred to form generally conical pleats nested tightly one against another.
(b) the stick having a last-shirred open end including a terminal edge of the casing length which extends substantially normal the longitudinal axis of the casing length and which contains at least one pointed tag of casing formed by a tear extending obliquely inward from said terminal edge; and
(c) said stick having a first-shirred end including a terminal edge of the casing length which extends substantially normal the longitudinal axis of the casing length and is tag-free.

29. A shirred casing article as in claim 28 wherein said food casing is an unreinforced cellulosic casing.

30. A shirred casing article as in claim 29 wherein said unreinforced cellulosic casing has an inflated diameter of about 15 mm to 40 mm

* * * * *